UNITED STATES PATENT OFFICE 2,036,935

PROCESS FOR CONVERTING ALKALI SALTS OF PHENYLALKYL BARBITURIC ACIDS INTO STABLE CALCIUM COMPOUNDS

Paul Reinhold Grüter, Berlin-Charlottenburg, Germany

No Drawing. Application April 16, 1935, Serial No. 16,730. In Germany March 5, 1934

1 Claim. (Cl. 167—65)

It is well known that the calcium salts of phenylalkyl barbituric acids can themselves be prepared only with some bother and that they readily decompose.

If the alkali salts of phenylalkyl barbituric acids are mixed with crystallized calcium bromide then products are obtained with formation of the calcium salt of the barbituric acid in question which experience has shown keep for only a short time and ultimately partially decompose up to the formation of ureides.

It has now been found that stable interaction products can be prepared from the alkali salts of phenylalkyl barbituric acids and calcium bromide if these compounds are caused to interact, e. g. by rubbing up, and the product obtained is mixed with wholly or highly dehydrated calcium bromide. The stability is the greater, especially towards higher temperatures (tropical temperatures), when wholly dehydrated calcium bromide is added.

The products dissolve readily in water; on account of their content of phenylalkyl barbituric acid, calcium and bromide they are particularly suited for use as sedatives and soporifics, and furthermore they are not so poisonous as the barbituric acid salts alone.

Example 2.53 parts by weight of the sodium salt of phenylethyl barbituric acid are very intimately rubbed up, with exclusion of carbonic acid of the air, with 1.37 parts by weight of calcium bromide hydrate, having the formula $CaBr_2,4H_2O$, whereby the temperature is advantageously raised to about 50° by warming, until the interaction is effected. The reaction product is then mixed with 10 parts by weight of dehydrated calcium bromide.

The amount of the excess water-poor calcium bromide and its degree of dehydration must be so large that after the interaction and transference of the water of crystallization the calcium bromide present is still dehydrated approximately at least to the dihydrate stage ($CaBr_2,2H_2O$). In the second phase of the reaction, therefore, a calcium bromide with only a molecular crystallization water content of less than $2H_2O$ can be used as addition substance.

For 1 mol of initial $CaBr_2,4H_2O$, therefore, for example about 2 mols of anhydrous $CaBr_2$ or about 4 mols of $CaBr_2,H_2O$ would have to be used for taking up the 4 mols of water of crystallization. The six mols of water from 1 mol of $CaBr_2,6H_2O$ would, for example, have to be taken up by at least about 3 mols of anhydrous $CaBr_2$ or 6 mols of $CaBr_2,H_2O$.

Having now described my invention, what I claim as new and desire to secure by Letters Patent is:—

A process for converting alkali salts of phenylalkyl barbituric acids into stable calcium compounds, characterized by the feature that a solid alkali salt of phenylalkyl barbituric acid is caused to interact with crystallized calcium bromide and the product obtained mixed with wholly or partially dehydrated calcium bromide.

PAUL REINHOLD GRÜTER.